US011619617B2

(12) United States Patent
Ito et al.

(10) Patent No.: US 11,619,617 B2
(45) Date of Patent: Apr. 4, 2023

(54) CHROMATOGRAPH HAVING OPERATION CONTROLLER THAT CAUSES AUTOMATIC PURGING IN A CASE OF DETECTION FAILURE

(71) Applicant: HITACHI HIGH-TECH SCIENCE CORPORATION, Tokyo (JP)

(72) Inventors: Masahito Ito, Tokyo (JP); Minling Pei, Tokyo (JP); Shinichi Ozawa, Kanagawa (JP)

(73) Assignee: HITACHI HIGH-TECH SCIENCE CORPORATION, Tokyo (JP)

( * ) Notice: Subject to any disclaimer, the term of this patent is extended or adjusted under 35 U.S.C. 154(b) by 862 days.

(21) Appl. No.: 16/565,197

(22) Filed: Sep. 9, 2019

(65) Prior Publication Data

US 2020/0103382 A1 Apr. 2, 2020

(30) Foreign Application Priority Data

Sep. 28, 2018 (JP) .............................. JP2018-185298

(51) Int. Cl.
*G01N 30/88* (2006.01)
*G01N 30/30* (2006.01)
*G01N 30/32* (2006.01)
*G01N 30/60* (2006.01)
*G01N 30/86* (2006.01)

(52) U.S. Cl.
CPC ............. *G01N 30/88* (2013.01); *G01N 30/30* (2013.01); *G01N 30/32* (2013.01); *G01N 30/6034* (2013.01); *G01N 30/8637* (2013.01); *G01N 2030/328* (2013.01); *G01N 2030/8804* (2013.01); *G01N 2030/889* (2013.01)

(58) Field of Classification Search
CPC ........ G01N 30/88; G01N 30/30; G01N 30/32; G01N 30/6034; G01N 30/8637; G01N 2030/025; G01N 35/00
See application file for complete search history.

(56) References Cited

U.S. PATENT DOCUMENTS

| 4,986,919 A | * | 1/1991 | Allington | ............... | F04B 49/065 |
| | | | | | 417/18 |
| 5,441,700 A | * | 8/1995 | Markelov | ............... | G01N 30/24 |
| | | | | | 422/63 |
| 2012/0166098 A1 | | 6/2012 | Mccreary et al. | | |

(Continued)

FOREIGN PATENT DOCUMENTS

| JP | 4-130271 A | 5/1992 |
| JP | 2004354144 A | 12/2004 |
| JP | 2013518286 A | 5/2013 |

*Primary Examiner* — Michael Jung
(74) *Attorney, Agent, or Firm* — Holland & Hart, LLP (57) ABSTRACT

To make it easy to address the case in which a chromatograph does not appropriately operate. A chromatograph (liquid chromatograph 100) for analyzing a sample by supplying an eluent and the sample and separating a component contained in the sample to detect the component, the chromatograph including: a detection portion (controller 170) configured to detect a fault in the analysis; and an operation controller (controller 170) configured to cause a constituent element related to the analysis to perform at least one of an operation for identifying a factor of the fault and an operation for avoiding the fault.

6 Claims, 8 Drawing Sheets

(56) References Cited

U.S. PATENT DOCUMENTS

| | | | |
|---|---|---|---|
| 2015/0316571 A1* | 11/2015 | Creque | H02H 9/043 |
| | | | 323/312 |
| 2018/0128797 A1* | 5/2018 | Satpute | G01N 30/8675 |
| 2019/0178839 A1* | 6/2019 | Lyford | G01N 27/4473 |

* cited by examiner

CHROMATOGRAPH HAVING OPERATION CONTROLLER THAT CAUSES AUTOMATIC PURGING IN A CASE OF DETECTION FAILURE

This application claims the benefit of Japanese Patent Application No. 2018-185298 filed Sep. 28, 2018, which is hereby incorporated by reference in its entirety into this application.

BACKGROUND OF THE INVENTION

1. Field of the Invention

The present invention relates to a chromatograph, and more particularly, to a technology capable of facilitating an appropriate operation and the like of the chromatograph.

2. Description of the Related Art

As a technology capable of facilitating an appropriate operation of a chromatograph, there has been known a technology involving displaying a guidance on check items when a known sample is analyzed and an analysis error occurs (see, for example, Patent Literature 1).

SUMMARY OF THE INVENTION

However, when the chromatograph does not appropriately operate, the cause thereof cannot always be identified based on an analysis result. In addition, even when the guidance on the check items is displayed, skill and experience of a user may be required in some cases in order to address an error. Thus, it is not always easy to enable the chromatograph to appropriately operate.

The present invention has been made in view of the forgoing, and an object of the present invention is to make it easier to address the case in which a chromatograph does not appropriately operate.

In order to achieve the above-mentioned object, according to a first aspect of the present invention, there is provided a chromatograph for analyzing a sample by supplying an eluent and the sample and separating a component contained in the sample to detect the component, the chromatograph including: a detection portion configured to detect a fault in the analysis; and an operation controller configured to cause a constituent element related to the analysis to perform at least one of an operation for identifying a factor of the fault and an operation for avoiding the fault.

With this, when various faults in the analysis of the sample are detected, the operation for identifying the factors of the faults and the operation for avoiding the faults are performed. Thus, the case in which the chromatograph does not appropriately operate can easily be addressed.

According to the present invention, the case in which the chromatograph does not appropriately operate can easily be addressed.

DESCRIPTION OF THE EMBODIMENTS

Now, an embodiment of the invention is described in detail with reference to the drawings.

(Configuration of Liquid Chromatograph 100)

Figure 1:
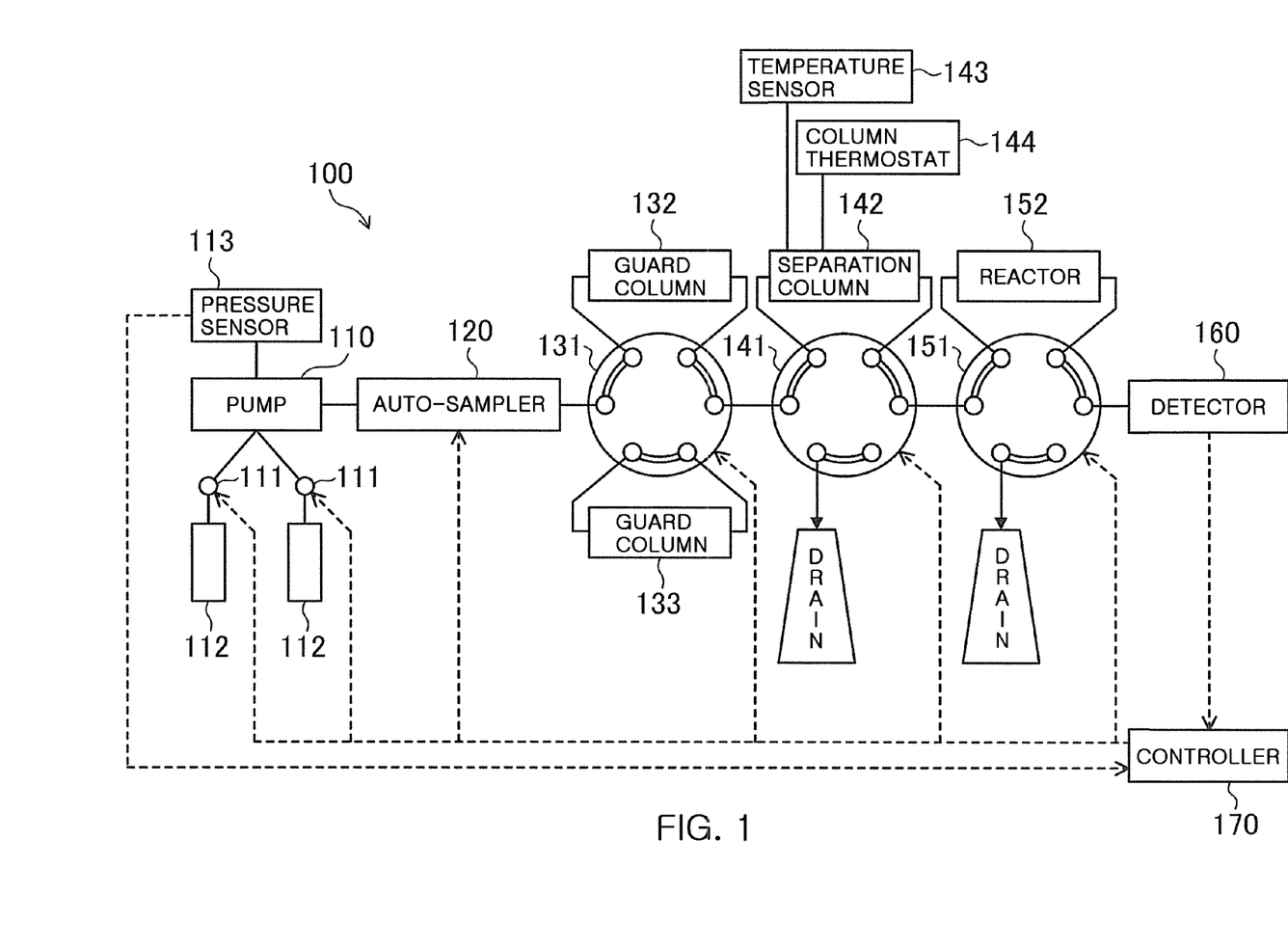
FIG. 1 is a block diagram for illustrating a schematic configuration of a chromatograph.

A schematic configuration of a liquid chromatograph 100 is illustrated in FIG. 1. The liquid chromatograph 100 includes a pump 110 (gradient pump), an auto-sampler 120, guard columns 132 and 133 (or pre-columns), a separation column 142, a temperature sensor 143 and a column thermostat 144, a reactor 152, a detector 160, and a controller 170 (detection portion, operation controller). The pump 110 is configured to feed an eluent supplied from an eluent tank 112 through a valve 111. The auto-sampler 120 is configured to inject a sample (not shown) and has an automatic purging function. The guard columns 132 and 133 are provided so as to be switchable with a six-way valve 131. The separation column 142 is provided so as to be separable with a six-way valve 141. The temperature sensor 143 and the column thermostat 144 are configured to detect and control the temperature of the separation column 142. The reactor 152 is provided so as to be separable with a six-way valve 151. The detector 160 is configured to detect a separated component in a sample. The controller 170 is configured to control the operation of each constituent element of the liquid chromatograph 100. One or a plurality of (in) line filters may be provided separably or switchably together with or in place of the guard columns 132, 133, and the like, and may be similarly controlled. In addition, the type of the reactor 152 is not particularly limited, and for example, a cartridge type reactor, a reaction column, or a reaction coil can be applied.

Figure 2:
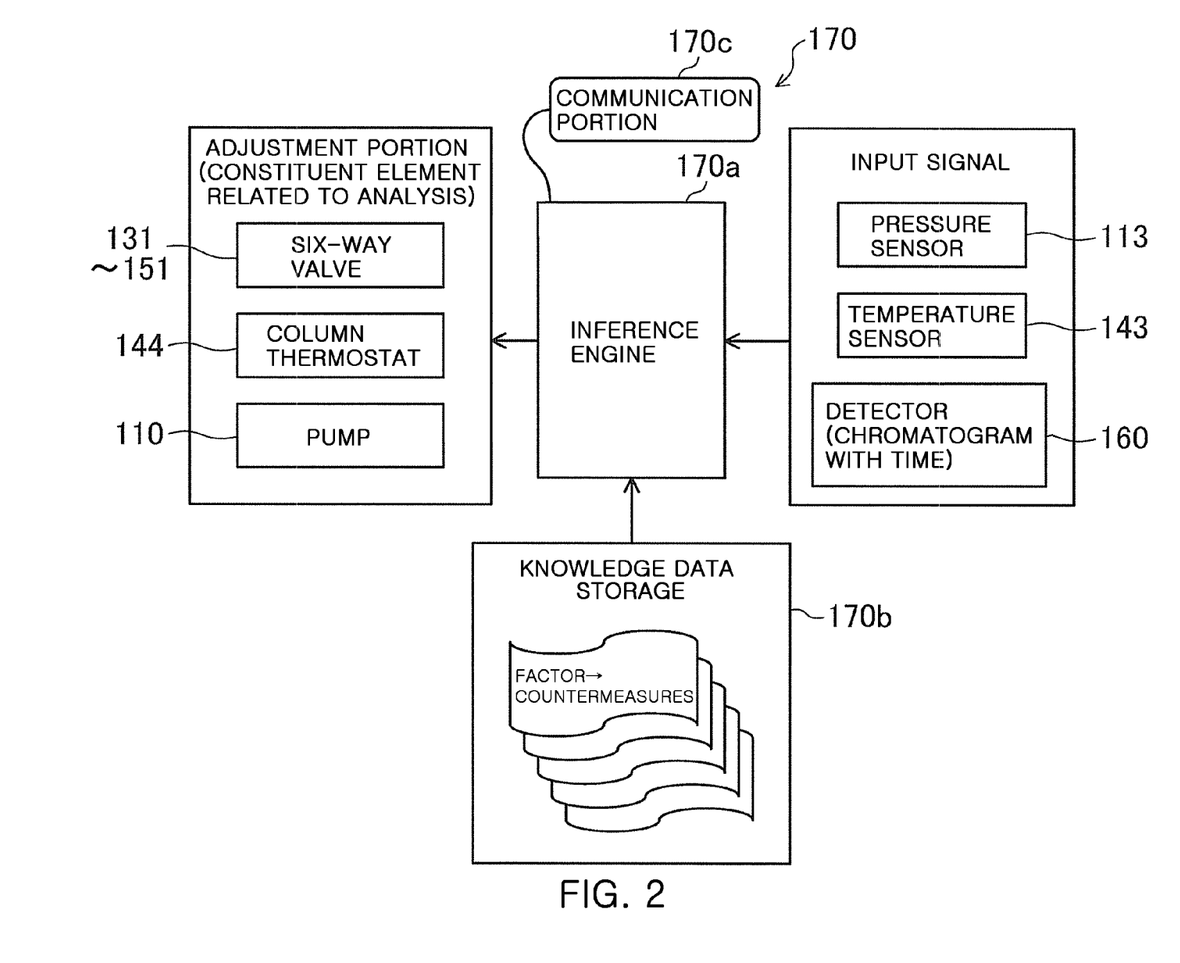
FIG. 2 is a block diagram for schematically illustrating a functional configuration of a controller 170.

Specifically, the controller 170 is configured to detect an abnormal increase in pump pressure and a fault such as a detection failure of each component, for example, based on the pump pressure detected by a pressure sensor 113, the temperature of the separation column 142 detected by the temperature sensor 143, and the detection result of each component in the sample detected by the detector 160, and to cause each portion to perform an operation for identifying a factor of the fault and an operation for avoiding the fault. More specifically, the controller 170 includes an inference engine 170a as illustrated in FIG. 2, and is configured to adjust the operations of the six-way valves 131 to 151, the column thermostat 144, and the pump 110 based on the knowledge data obtained from a knowledge data storage 170b and a communication portion 170c, and the like in accordance with the input signals input from the pressure sensor 113, the temperature sensor 143, and the detector 160. Now, a specific example is described below.

(Identification of Factor of Pump Pressure Abnormality and Avoidance of Abnormality)

When the pump pressure detected by the pressure sensor 113 is abnormally increased, the controller 170 identifies a factor of an increase in pump pressure by sequentially switching to control the six-way valves 131 to 151, for example, as shown in Table 1.

TABLE 1

| Phenomenon | Sensing data | Operation for identifying factor or operation for countermeasures, and results | Presumed factor | Other operation examples |
|---|---|---|---|---|
| Increase in pressure | Pump Pressure | Pressure is decreased through separation of reactor 152 | Failure of reactor 152 | Guidance on replacement of reactor 152 |
| | | Pressure is decreased through separation of separation column 142 | Failure of separation column 142 | Guidance on replacement of separation column 142 |
| | | Pressure is decreased through switching from guard column 132 to guard column 133 | Failure of guard column 132 | |
| | | Pressure is decreased through switching from guard column 133 to guard column 132 | Failure of guard column 133 | |
| | | | Unclear | Guidance on service call |
| Separation failure | Chromatogram (Separation degree) | Switching of eluent is delayed | Switching of eluent is excessively early | |
| | | Switching of eluent is hastened | Switching of eluent is excessively late | |
| | | Column temperature is changed | Column temperature is inappropriate | |
| | | Switching timing of column temperature is changed | Switching timing of column temperature is inappropriate | |
| | | Composition of eluent is changed | Composition of eluent is inappropriate | |
| Low peak | Chromatogram (Peak height) | Peak height is increased by performing AS automatic purging when AS automatic purging has not been performed | Purging is insufficient | |
| | | | Ninhydrin reagent is degraded or reference sample is degraded | In case in which peak height is low even after AS automatic purging is performed, when two or more weeks have elapsed after replacement of ninhydrin reagent, replacement of ninhydrin reagent is presented, and when two or more weeks have not elapsed after replacement of ninhydrin reagent and one or more months have elapsed after preparation of reference sample, preparation of reference sample is presented. |

For example, first, the guard columns 132 and 133 are switched from one to another with the six-way valve 131. When the pump pressure is decreased to an appropriate pressure with this, the guard columns 132 and 133 are identified as the factor of the fault, and the fault is avoided, with the result that the subsequent detection can be appropriately performed.

In addition, when the pump pressure is not decreased even through switching of the guard columns 132 and 133, the reactor 152 is then separated from a liquid feeding flow passage with the six-way valve 151. When the pump pressure is decreased to an appropriate pressure with this, the reactor 152 is identified (presumed) as the factor of the fault. In this case, a message for prompting a user to replace the reactor 152 is displayed on a display portion (not shown). When the reactor 152 is replaced by the user, the subsequent detection can be appropriately performed.

Further, when the pump pressure is not decreased even through separation of the reactor 152, the separation column 142 is then separated from the liquid feeding flow passage with the six-way valve 141. When the pump pressure is decreased to an appropriate pressure with this, the separation column 142 is identified as the factor of the fault, and a message for prompting the user to replace the separation column 142 is displayed in the same manner as in the case of the reactor 152. When the separation column 142 is replaced by the user, the subsequent detection can be appropriately performed. The guard columns 132 and 133 may be switched after an attempt to separate the reactor 152 is made, that is, so that confirmation is performed sequentially from a downstream side.

When the factor of the fault is automatically identified, and the fault is avoided, inspection can be smoothly continued. In addition, it is not required for an analysis operator to pay attention to an appropriate pump pressure.

The number of the guard columns 132 and 133 to be provided is not limited to two. Only one guard column may be provided so as to be replaced by the user in the case of a fault in the same manner as in the separation column 142 and the reactor 152. Meanwhile, three or more guard columns may be provided so as to be sequentially switched to be used. In addition, each number of the separation column 142 and the reactor 152 to be provided is not always limited to one. A plurality of separation columns 142 and a plurality of reactors 152 may be provided, respectively, so as to be automatically switched.

In addition, when the six-way valves 131 to 151 are switched, for example, the flow rate of the pump may be controlled so that an abrupt increase in pump pressure is prevented.

In addition, when the factor of the fault cannot be identified even though the above-mentioned operations are performed, for example, an inquiry to an expert may be automatically made through communication means such as the Internet or a message for prompting the user to make an inquiry through service call through use of a telephone, sending of mail, or the like.

(Detection and Avoidance of Fault Through Analysis of Chromatogram)

The detection of a fault through analysis is not limited to the detection using a sensor such as the pressure sensor 113 as described above. For example, the fault may be detected by obtaining a chromatographic performance indicator through analysis of a chromatogram obtained after measurement is performed once or more. In addition, the operation for identifying a factor of the fault or the operation for avoiding the fault may be the operation of setting various apparatus setting parameters set in an apparatus for measurement. As the chromatographic performance indicator, for example, a Resolution, a separation factor, theoretical plate number, a peak area, a peak height, a peak width, a retention time, a holdup time, a retention factor, a height equivalent to a theoretical plate, a column pressure loss, a symmetry factor, a peak-valley ratio, an SN ratio, a baseline noise, a baseline drift, a limit of detection, a limit of quantitation, accuracy, and trueness can be applied. In particular, for example, a degree of a separation performance including at least one of the Resolution, the separation factor, the theoretical plate number, the height equivalent to a theoretical plate, and the peak width of the component can be applied. In addition, the apparatus setting parameters refer to setting of hardware, and for example, a gradient elution time program, an eluent switching timing, an eluent composition, a flow rate, an injection volume, a sample dilution magnification ratio, a column temperature, a column temperature switching timing, column selection, a reaction temperature, a reaction reagent composition, a detection wavelength, a detection wavelength switching timing, and a response time constant can be applied. In particular, for example, an elution condition including at least one of the eluent switching timing, the gradient elution time program, the column temperature switching timing, and the flow rate can be applied.

With this, the measurement operation can also be changed on the apparatus side so as to satisfy an optimum condition. Further, for example, in the case in which samples each having the same composition are mounted on a plurality of auto-samplers in order to perform repeating measurement or the like, when a fault is detected as described above through analysis of an initial measurement result, the setting may be changed to perform subsequent measurement. In this case, the change in setting in the apparatus may be announced to repeat measurement. In addition, the change in condition may be instructed to a measurer.

In addition, it may be determined whether or not the set condition has a flaw or whether or not the apparatus side is not operated in accordance with the set condition for some reason although the set condition is appropriate, and the operation in accordance with the determination may be performed. That is, for example, when the Resolution is less than a threshold value (specifically, for example, when the separation degree between Ala and Cys is less than 1.2), this fault is generally caused by a flaw of the set condition. However, there is also a possibility that the theoretical plate number of the separation column that is the constituent element of the apparatus may be decreased although the set condition is appropriate. In such case, the number of theoretical stages of the separation column as well as the separation degree are added to a determination indicator, and it can be determined whether the fault is caused by the condition flaw or the apparatus. In the case of the condition flaw, the set condition is changed. In this case, for example, when the theoretical plate number of an isolated peak of Gly or the like is less than 3,000, it is determined that the fault is caused by the apparatus. Then, this determination may be displayed as a presumed factor caused by the apparatus or an operation of avoiding the fault, such as a switching operation of a (separation) column, may be caused to be performed.

(Avoidance of Separation Degree Failure 1)

When it is detected that the separation degree of a predetermined component is not appropriate through analysis of the chromatogram obtained as the detection result of the detector 160, the separation failure can be automatically avoided by controlling the eluent switching timing also as shown in Table 1.

Figure 3A:
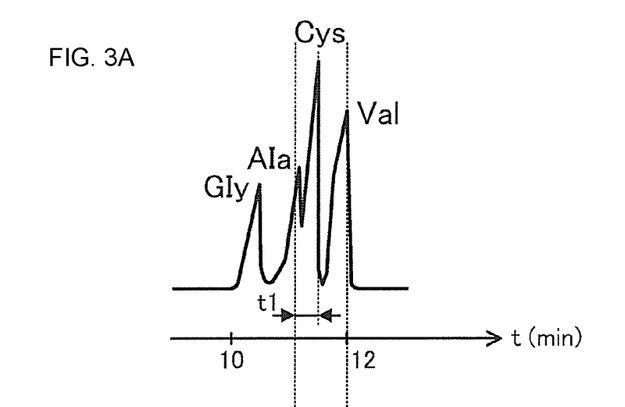
FIG. 3A, FIG. 3B, and FIG. 3C each are an explanatory graph for showing an example of a part of a chromatogram.
Figure 3B:
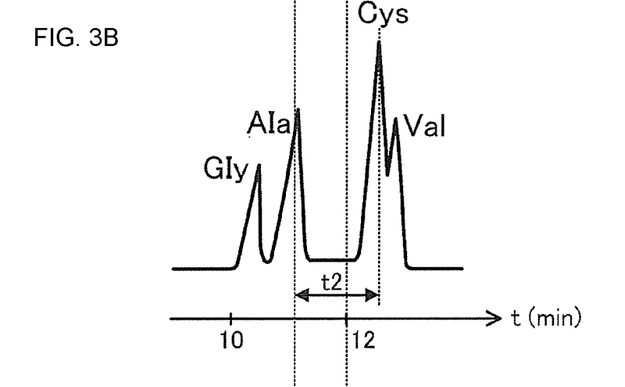
Figure 3C:
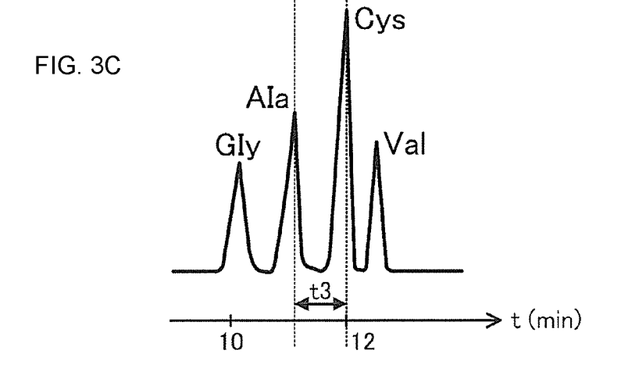

Specifically, for example, in the case in which analysis of an amino acid is performed through use of a gradient method, when there is detected an early peak state, which is at least one of a state in which a Resolution between alanine (Ala) and cysteine (Cys) is 1.0 or less and a state in which a peak time difference t1 between alanine (Ala) and cysteine (Cys) is a predetermined time or less, as shown in FIG. 3A, the eluent switching timing is delayed through control of the valve 111. Meanwhile, when there is detected a late peak state, which is at least one of a state in which a Resolution between cysteine (Cys) and valine (Val) is 1.0 or less and a state in which a peak time difference t2 between alanine (Ala) and cysteine (Cys) is a predetermined time or more, as shown in FIG. 3B, the eluent switching timing is hastened through control of the valve 111. When such control is performed, a peak time difference t3 between alanine (Ala) and cysteine (Cys) can be set to be appropriate as shown in FIG. 3C.

(Avoidance of Separation Degree Failure 2)

Figure 4:
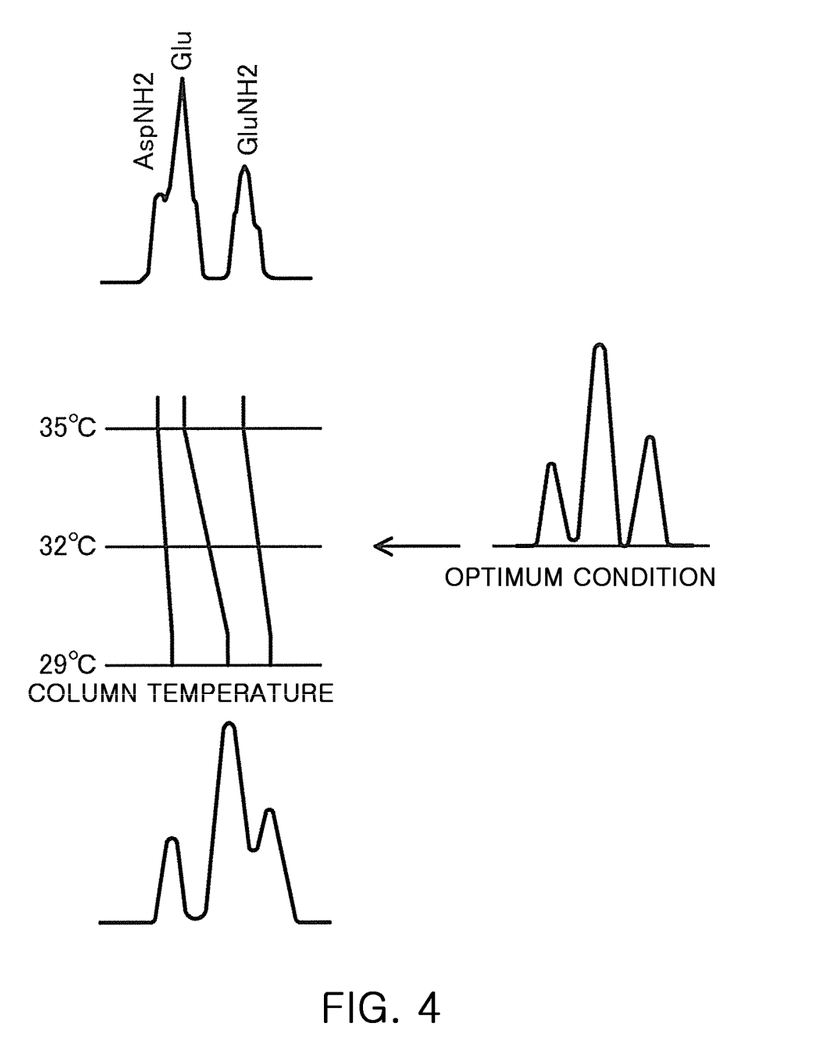
FIG. 4 is an explanatory graph for showing an example of a part of another chromatogram.

The influence of the column temperature on the retention time of each component contained in the sample varies depending on the sample. For example, as shown in FIG. 4, in Glu, a degree of increase in retention time in the case of a low column temperature is large as compared to those of AspNH2 and GluNH2. In view of the foregoing, in the same manner as in the above-mentioned (Avoidance of Separation Degree Failure 1), when it is detected that the Resolution of a predetermined component is not appropriate through analysis of the chromatogram obtained as the detection result of the detector 160, a factor of the separation degree failure may be identified or the separation degree failure may be automatically avoided through control of the set temperature of the column thermostat 144.

(Avoidance of Separation Degree Failure 3)

Figure 5:
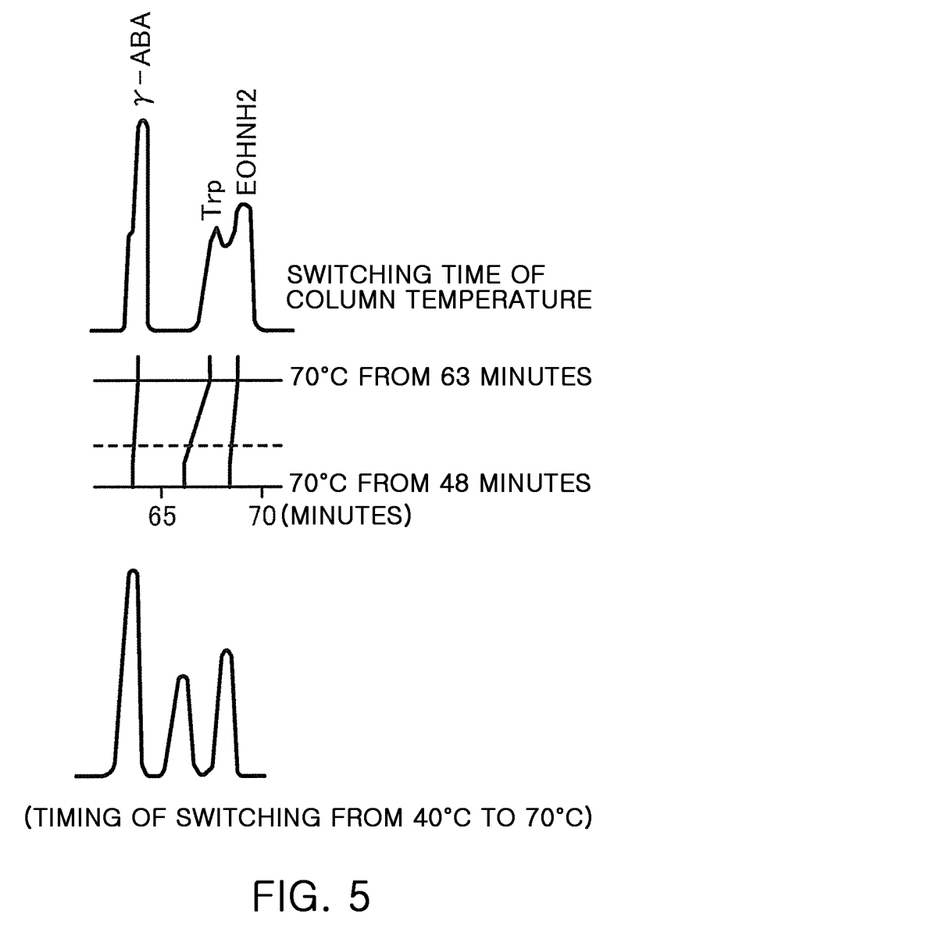
FIG. 5 is an explanatory graph for showing an example of a part of another chromatogram.

In addition, for example, as shown in FIG. 5, the separation degree failure can be avoided by switching the timing, at which the set temperature of the column thermostat 144 is switched from 40° C. to 70° C., from 63 minutes to 48 minutes after a predetermined reference time to mainly shorten only the retention time of Trp.

(Avoidance of Separation Degree Failure 4)

Figure 6:
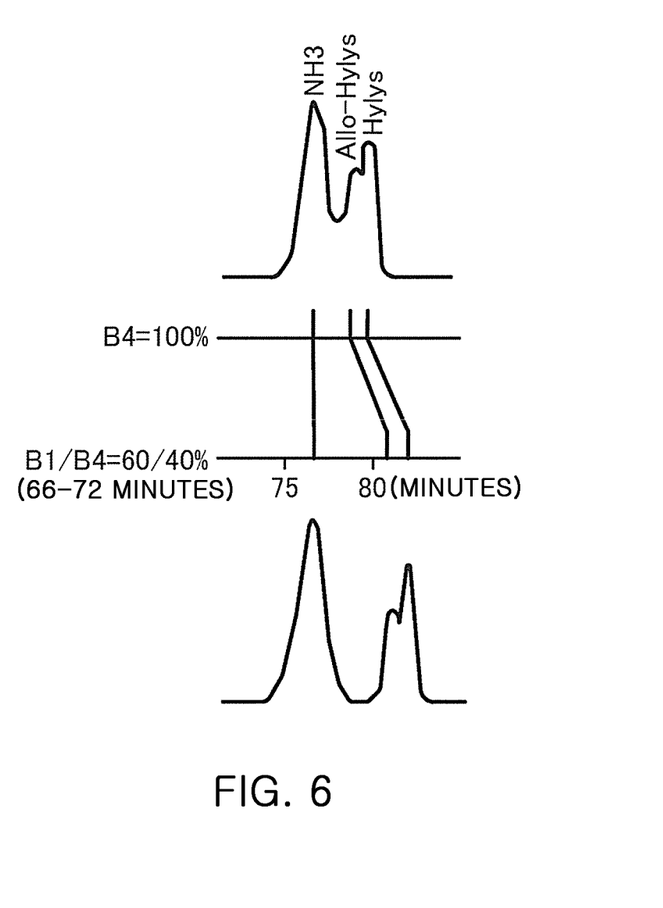
FIG. 6 is an explanatory graph for showing an example of a part of another chromatogram.

In addition, for example, as shown in FIG. 6, the separation failure of NH3 and Hylys (and an isomer thereof) can be avoided by changing the composition of an eluent from B4=100% to B1/B4=60/40% during a period from 66 minutes to 72 minutes after a predetermined reference time.

(Avoidance of Separation Degree Failure 5)

Figure 7:
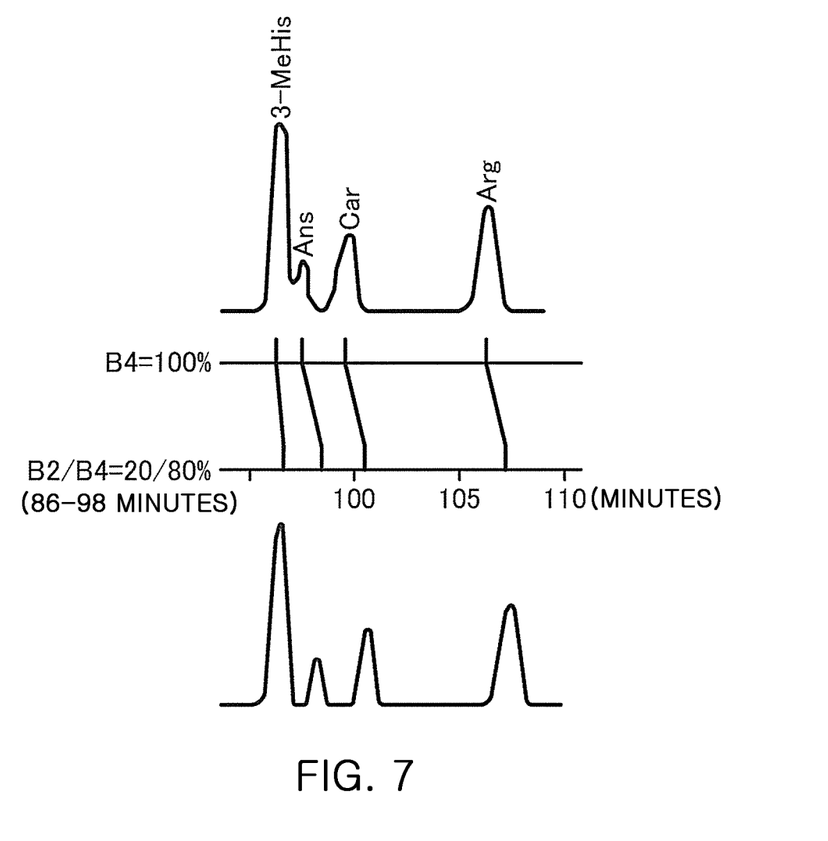
FIG. 7 is an explanatory graph for showing an example of a part of another chromatogram.

In addition, for example, as shown in FIG. 7, the separation failure of 3Mehis, Ans, and Car can be avoided by changing the composition of an eluent from B4=100% to B2/B4=20/80% during a period from 85 minutes to 98 minutes after a predetermined reference time.

(Avoidance of Peak Height Failure)

Figure 8:
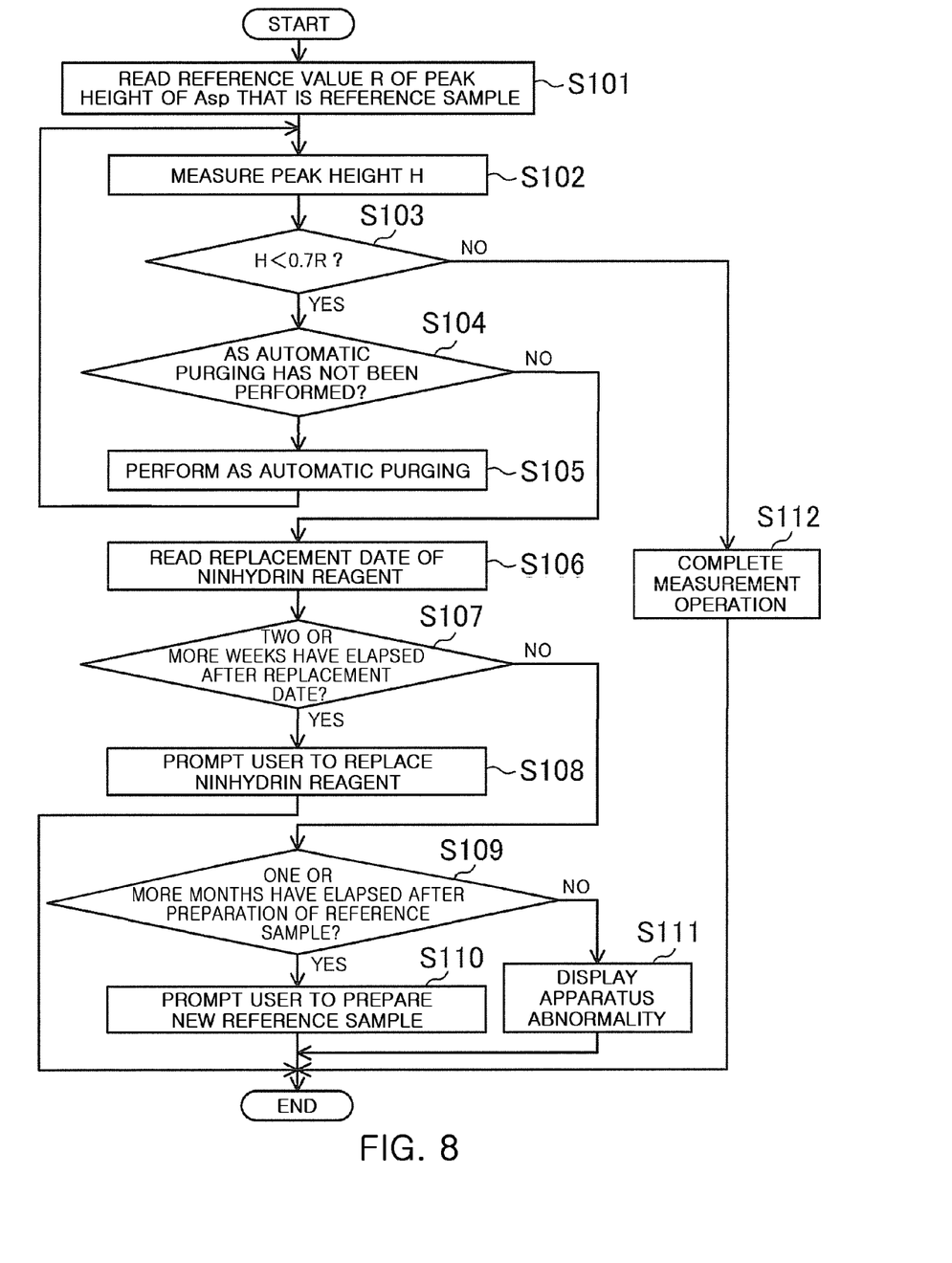
FIG. 8 is a flowchart for illustrating an operation of the chromatograph.

Description is given of an exemplary case in which, for example, it is detected that the peak height of aspartic acid (Asp) is not appropriate through analysis of the chromatogram obtained as the detection result of the detector 160 with reference to a flowchart of FIG. 8 and the above-mentioned Table 1.

(Step S101)

First, prior to analysis, a reference value R of a peak height at a time when aspartic acid (Asp) that is a reference sample is detected is read from a database or the like (not shown).

(Step S102)

When the analysis of the sample is performed, a peak height H is measured based on a chromatogram of an analysis result.

(Step S103)

It is determined whether or not the measured peak height H is, for example, less than 0.7 time the reference value R. When the measured peak height H is not less than 0.7 time the reference value R, the flow proceeds to (Step S112), and for example, a measurement completion display or the like is performed. Thus, a measurement operation is completed.

(Step S104)

Meanwhile, when the measured peak height H is, for example, less than 0.7 time the reference value R, it is determined whether or not automatic purging of the auto-sampler (AS) 120 has been performed.

(Step S105)

When it is determined that the automatic purging has not been performed in (Step S104) as described above, the automatic purging is performed. After that, the flow is returned to (Step S102), and the analysis is performed again. Thus, the steps subsequent to the measurement of the peak height H are repeated. Specifically, an attempt to avoid the peak height failure is made. When the peak height failure has been avoided, the flow proceeds to (Step S112) as described above, and the measurement operation is completed.

Meanwhile, when the automatic purging has been performed, for example, in order to present another avoidance measures to a user, a replacement date of a ninhydrin reagent is first read.

(Step S107)

It is determined whether or not two or more weeks have elapsed after the replacement date of the ninhydrin reagent.

(Step S108)

When two or more weeks have elapsed after the replacement date of the ninhydrin reagent, a message for prompting the user to replace the ninhydrin reagent is displayed, and the measurement operation is completed.

(Step S109)

In addition, when two or more weeks have not elapsed after the replacement date of the ninhydrin reagent, it is determined whether or not one or more months have elapsed after the preparation of the reference sample.

(Step S110)

When one or more months have elapsed after the preparation of the reference sample, a message for prompting the user to prepare a new reference sample is displayed, and the measurement operation is completed.

(Step S111)

Meanwhile, when one or more months have not elapsed after the preparation of the reference sample, another factor is presumed. Therefore, for example, display for showing an abnormal state of the apparatus is performed, and the measurement operation is completed. When such unclear factor is presumed, an inquiry to an expert may be automatically made through communication means such as the Internet or a message for prompting the user to make an inquiry through service call through use of a telephone, sending of mail, or the like.

When it is determined in (Step S103) that the peak height H is, for example, less than 0.7 time the reference value R, the automatic purging of the auto-sampler 120 is always performed. After that, confirmation of other factors and the like are performed after (Step S106) without performing automatic analysis again, and the measurement operation may be completed.

As described above, when various faults in the analysis of the sample are detected, the operation for identifying the factors of the faults and the operation for avoiding the faults are performed. Thus, the case in which the chromatograph does not appropriately operate can be easily addressed.

What is claimed is:

1. A chromatograph for analyzing a sample by supplying an eluent and the sample and separating a component contained in the sample to detect the component, the chromatograph comprising:
   a controller configured to:
      detect a fault in an analysis; and
      cause a constituent element related to the analysis to perform at least one of an operation for identifying a factor of the fault and an operation for avoiding the fault, wherein the controller is configured to detect a separation degree failure in the analysis with a chromatographic performance indicator regarding the component based on a detection result of the component contained in the sample, and
      wherein the controller is configured to cause one of an operation of controlling an apparatus setting parameter regarding an eluent switching timing or column temperature in the analysis and an operation of switching the constituent element related to the analysis to another constituent element to be performed in accordance with the detection result.

2. The chromatograph according to claim 1, wherein the apparatus setting parameter regarding the column temperature is a column temperature or a column temperature switching timing.

3. The chromatograph according to claim 1, wherein the chromatograph is configured to analyze an amino acid,
   wherein the controller is configured to detect:
      an early peak state, which is at least one of a state in which a resolution between a first component and a second component which is different from the first component is a predetermined degree or less and a state in which a peak time difference between the first component and the second component is a predetermined time or less; and
      a late peak state, which is at least one of a state in which a resolution between the second component and a third component which is different from the first component and the second component is a predetermined degree or less and a state in which a peak time difference between the first component and the second component is a predetermined time or more, and
      wherein the controller is configured to hasten a switching timing of a predetermined eluent in case of the late peak state while delaying the switching timing of the predetermined eluent in case of the early peak state.

4. The chromatograph according to claim 3, wherein the first component is alanine, the second component is cysteine, and the third component is valine.

5. The chromatograph according to claim 1, wherein the constituent element related to the analysis includes an auto-sampler having an automatic purging function,
   wherein the controller is configured to detect a detection failure in which a ratio between a peak height of a detected predetermined component and a reference value of a peak height of a reference sample is equal to or smaller than a predetermined ratio, and wherein the controller is configured to cause the autosampler to perform automatic purging in a case of the detection failure.

6. The chromatograph according to claim 5, wherein the chromatograph is configured to analyze an amino acid, and wherein the detection failure is a failure in which a peak height of detected aspartic acid and the reference value of the peak height of the reference sample is equal to or smaller than a predetermined ratio.

\* \* \* \* \*